(12) United States Patent
Loeser et al.

(10) Patent No.: US 8,484,238 B2
(45) Date of Patent: *Jul. 9, 2013

(54) AUTOMATICALLY GENERATING REGULAR EXPRESSIONS FOR RELAXED MATCHING OF TEXT PATTERNS

(75) Inventors: Alexander Stephan Loeser, Berlin (DE); Sriram Raghavan, San Jose, CA (US); Shivakumar Vaithyanathan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 536 days.

This patent is subject to a terminal disclaimer.

(21) Appl. No.: 12/125,290

(22) Filed: May 22, 2008

(65) Prior Publication Data

US 2009/0070328 A1    Mar. 12, 2009

Related U.S. Application Data

(63) Continuation of application No. 11/850,987, filed on Sep. 6, 2007, now abandoned.

(51) Int. Cl.
*G06F 17/30* (2006.01)

(52) U.S. Cl.
USPC ............... 707/769; 707/999.006; 707/708; 707/705

(58) Field of Classification Search
USPC ............ 707/705, 708, 769, 999.006
See application file for complete search history.

(56) References Cited

U.S. PATENT DOCUMENTS

| | | | | |
|---|---|---|---|---|
| 2003/0050782 | A1* | 3/2003 | Zweig et al. | 704/270 |
| 2004/0015909 | A1* | 1/2004 | Cho et al. | 717/143 |
| 2004/0225999 | A1* | 11/2004 | Nuss | 717/114 |
| 2006/0020937 | A1* | 1/2006 | Schaefer | 717/175 |
| 2007/0112731 | A1* | 5/2007 | Balasubramanian | 707/3 |

OTHER PUBLICATIONS

Article entitled "Avatar Information Extraction System", dated Apr. 24, 2006, by Jayram et al.*
Article entitled "Regular Expressions Howto", dated Aug. 28, 2005, by Kuchling.*
Article entitled "The 30 Minutes Regex Tutorial" by Expresso dated May 14, 2007.*
Article entitled "Managing Information Extraction" by Doan et al. dated 2006.*
Article entitled "Avatar: Using Text analytics to bridge the structured-unstructured divide" by Zhu et al. dated 2004.*

(Continued)

*Primary Examiner* — Mahesh Dwivedi
(74) *Attorney, Agent, or Firm* — Schmeiser, Olsen & Watts, LLP

(57) ABSTRACT

A method and system for automatically generating regular expressions for relaxed matching of text patterns. A received input phrase expressed in a natural language is determined to be a plain text pattern. The plain text pattern is automatically tokenized, thereby generating a first token list. Rules loaded from a predefined rule set are automatically applied to the first token list to automatically generate a modified token list. The order of the rules being applied to the first token list is specified by the rule set. The modified token list is automatically converted into a regular expression that matches the plain text pattern and one or more variations of the plain text pattern. A utilization of the regular expression for an information extraction facilitates a recall and a precision of the information extraction.

6 Claims, 12 Drawing Sheets

OTHER PUBLICATIONS

Article entitled "Navigating the Intranet with High Precision" by Zhu et al. dated May 2007.*

William W. Cohen; Enron Email Dataset [online], 2005 [retrieved May 1, 2007]. Retrieved from the Internet: <URL: http://www.cs.cmu.edu/~enron/>.

Ultrapico; Expresso Regular Expression Development Tool [online] [retrieved on Aug. 27, 2007]. Retrieved from the Internet: <URL: http://www.ultrapico.com/Expresso.htm>.

Cunningham et al.; Gate: An Architecture for Development of Robust HLT Applications; Proceedings of the 40th Anniversary Meeting of the Association for Computational Linguistics [online], 2002 [retrieved on Aug. 28, 2007]. Retrieved from the Internet: <URL: http://delivery.acm.org/10.1145/1080000/1073112/p168-cunningham.pdf?key1=1073112&key2=8520138811&coll=&dl=&CFID=15151515&CFTOKEN=6184618>.

Jayram et al.; Avatar Information Extraction System; IEEE Data Eng. Bull. vol. 29, No. 1, 2006; 9 pages.

Lappin et al.; An Algorithm for Pronominal Anaphora Resolution; Computational Linguistics, vol. 20, No. 4, 1994; 26 pages.

Appelt et al.; The Common Pattern Specification Language; Annual Meeting of the Association for Computational Linguistics, Proceedings of a workshop held at Baltimore, Maryland: Oct. 13-15, 1998; pp. 23-30.

Swee Huat, Tan; Rexpression: Improving Matching for Script Based Dialogue Managers; Submitted in partial fulfillment of Bachelor of Science requirements; Curtin University of Technology, West Australia, Nov. 2005; 121 pages.

* cited by examiner

300

```
<ruleset>
  <rule>
     <ruletype>WHITESPACE</ruletype>
     <stackposition>3</stackposition>
     <replacement>\W+</replacement>
  </rule>
  <rule>
     <ruletype>REPLACE_WORD</ruletype>
     <stackposition>1</stackposition>
     <searchphrase>did not</searchphrase>
     <replacement>((did\s+not)|(didn't))</replacement>
  </rule>
  <rule>
     <ruletype>SPLIT_AT_CHARACTER</ruletype>
     <stackposition>1</stackposition>
     <searchphrase>:</searchphrase>
  </rule>
  <rule>
     <ruletype>REPLACE_WORD</ruletype>
     <stackposition>2</stackposition>
     <searchphrase>:</searchphrase>
     <replacement>(\s*:\s*)</replacement>
  </rule>
</ruleset>
```

REPLACE_WORD Algorithm
Require: String searchphrase, String replacementRegEx, List tokenizedInput
1: List offSets ← searchOffSets(searchphrase,tokenizedInput)
2: List tokenizedOutput ← ∅
3: int beginPointer ← 0
4: for all int singleOffSet ∈ offSets do
5:    int offsetStart ← singleOffSet
6:    int offsetEnd ← offsetStart+countTokens(searchphrase)
7:    tokenizedOutput ← appendTokensBeforeOffset(beginPointer,offsetStart,tokenizedInput,tokenizedOutput)
8:    tokenizedOutput ← appendRegExToken(createRegExToken(replacementRegEx),tokenizedOutput)
9:    beginPointer ← offsetEnd
10: end for
11: tokenizedOutput ← appendFromLastOffsetEnd(beginPointer,tokenizedInput,tokenizedOutput)
12: Return tokenizedOutput

FIG. 4A

<BOUNDARY> <TXT>I<TXT> <BOUNDARY> <DELIM>
<BOUNDARY> <TXT>did<TXT> <BOUNDARY> <DELIM> <BOUNDARY> <TXT>not<TXT> <BOUNDARY>
<DELIM> <BOUNDARY> <TXT>call<TXT> <BOUNDARY>

<BOUNDARY> <TXT>I<TXT> <BOUNDARY> <DELIM>
<REGEX>((did\s+not)|(didn't))<REGEX>
<DELIM> <BOUNDARY> <TXT>call<TXT> <BOUNDARY>

\b|\b\W+\b((did\s+not)|(didn't))\b\W+\bcall\b

<BOUNDARY> <TXT>phonenumber<TXT> <TXT>:<TXT>
<TXT>123-4567-890<TXT> <BOUNDARY>

<BOUNDARY> <TXT>phonenumber<TXT> <REGEX>(\s*:\s*)<REGEX>
<TXT>123-4567-890<TXT> <BOUNDARY>

\bphonenumber(\s*:\s*)123-4567-890\b

| ID | Entity (Subject) | Relationship | Entity (Object) | #chars |
|---|---|---|---|---|
| 1 | Person | can be reached at | Phone Number | 30 |
| 2 | Person | can be contacted at | Phone Number | 30 |
| 3 | Person | a call at | Phone Number | 30 |
| 4 | Person | number is | Phone Number | 30 |
| 5 | Person | at | Phone Number | 30 |
| 6 | Person | works for | Organization | 30 |
| 7 | Person | working for | Organization | 30 |
| 8 | Person | working with | Organization | 30 |
| 9 | Person | work with | Organization | 30 |
| 10 | Person | Assistant | Person | 30 |
| 11 | Person | works for | Person | 30 |
| 12 | Organization | agreed to buy | Organization | 30 |
| 13 | Organization | merged with | Organization | 30 |
| 14 | Organization | acquisition of | Organization | 30 |
| 15 | Organization | acquired | Organization | 30 |
| 16 | Organization | acquire | Organization | 30 |

FIG. 6

**Results: *Person ... Phonenumber***

| ID | retrieved(#a) | recall(%) | precision(#a) | precision(%) | reasons for false positive |
|---|---|---|---|---|---|
| handcrafted-30 | 1034 | 50.8 | 980 | 94.8 | 49x sentence boundaries; 5 invalid entity recognitions |
| generated-30 | 1811 | 86.5 | 1668 | 92.1 | 81x sentence boundaries; 62 invalid entity recognitions |

FIG. 7A

**Results: *Person ... Person***

| ID | retrieved(#a) | recall(%) | precision(#a) | precision(%) | reasons for false positive |
|---|---|---|---|---|---|
| handcrafted-30 | 158 | 71.4 | 142 | 90.0 | 2x sentence boundaries; 16 invalid entity recognitions |
| generated-30 | 254 | 92.0 | 183 | 72.0 | 2x sentence boundaries; 69 invalid entity recognitions |

Results: *Person ... Organization*

| ID | retrieved(#a) | recall(%) | precision(#a) | precision(%) | reasons for false positive |
|---|---|---|---|---|---|
| handcrafted-30 | 9 | 21.2 | 7 | 77.8 | 0x sentence boundaries; 2 invalid entity recognitions |
| generated-30 | 25 | 57.6 | 19 | 76.0 | 1x sentence boundaries; 5 invalid entity recognitions |

Results: *Organization ... Organization*

| ID | retrieved(#a) | recall(%) | precision(#a) | precision(%) | reasons for false positive |
|---|---|---|---|---|---|
| handcrafted-30 | 54 | 78.8 | 52 | 96.3 | 2x sentence boundaries; 0 invalid entity recognitions |
| generated-30 | 56 | 81.8 | 54 | 96.4 | 2x sentence boundaries; 0 invalid entity recognitions |

FIG. 7D

AUTOMATICALLY GENERATING REGULAR EXPRESSIONS FOR RELAXED MATCHING OF TEXT PATTERNS

This application is a continuation application claiming priority to Ser. No. 11/850,987, filed Sep. 6, 2007.

FIELD OF THE INVENTION

The present invention relates to a method and system for automatically generating regular expressions for relaxed matching of text patterns.

BACKGROUND OF THE INVENTION

One category of information extraction employs query expansion and other query processing techniques in search engines. Conventional query expansion techniques generate an expanded output query from an original query, where the expanded output query includes additional words obtained from a synonym dictionary. The results of the expanded output query are documents that contain either the keywords of the original query or the additional words from the synonym dictionary. Being based on a natural language dictionary (e.g., standard English dictionary), the synonym dictionary is limited in its ability to match certain text pattern variations related to punctuation, spacing, new lines between words, arbitrary capitalization, colloquial abbreviations, etc. Further, known query processing techniques that employ stemming and stop word removal decrease precision in information retrieval results. Another category of information extraction is rule-based and utilizes regular expressions. Conventional tools (e.g., Expresso offered by Ultrapico) in this second category allow a programmer to generate a regular expression using a graphical user interface and to check the syntax of a generated regular expression. These known regular expression generation tools are hampered by restricted usability because their users are required to have knowledge of the formulation and usage of syntactic constructs in regular expressions. Thus, there exists a need to overcome at least one of the preceding deficiencies and limitations of the related art.

SUMMARY OF THE INVENTION

The present invention provides a computer-implemented method of automatically generating regular expressions for relaxed matching of text patterns, comprising:

receiving, by a computing system, an input phrase expressed in a natural language;

determining, by the computing system, that the input phrase is a plain text pattern;

automatically tokenizing, by the computing system, the plain text pattern, wherein the automatically tokenizing includes automatically generating a first token list;

automatically applying, by the computing system, one or more rules to the first token list, wherein the automatically applying includes automatically modifying the first token list and automatically generating a modified token list in response to the automatically modifying the first token list; and automatically converting, by the computing system, the modified token list into a regular expression, wherein the regular expression matches the plain text pattern and one or more variations of the plain text pattern.

A system and computer program product corresponding to the above-summarized method are also described and claimed herein.

Advantageously, the present invention provides a technique for automatically generating regular expressions for a relaxed matching of text patterns. Further, the present invention provides a generic, extensible, and widely applicable rule-based framework in which the automatic generation of regular expressions is based on the creation and updating of rules without requiring the writing and maintenance of complex and customized software programs.

BRIEF DESCRIPTION OF THE DRAWINGS

FIG. 3 depicts an example of a rule set included in the relaxation rule file of the system of FIG. 1A or FIG. 1B, in accordance with embodiments of the present invention.

FIG. 4A depicts an algorithm to apply a REPLACE_WORD rule included in the rule set of FIG. 3, in accordance with embodiments of the present invention.

FIG. 4B depicts an exemplary tokenized phrase generated via the process of FIG. 2, in accordance with embodiments of the present invention.

FIG. 4C depicts an exemplary set of tokens resulting from executing the algorithm of FIG. 4A to apply the REPLACE_WORD rule included in the rule set of FIG. 3 to an escaped version of the phrase of FIG. 4B, in accordance with embodiments of the present invention.

FIG. 4D depicts an exemplary regular expression generated by replacing tokens in the set of tokens of FIG. 4C via the process of FIG. 2, in accordance with embodiments of the present invention.

FIG. 5B depicts an exemplary set of tokens resulting from applying the rule of FIG. 5A via the process of FIG. 2, in accordance with embodiments of the present invention.

FIG. 5C depicts an exemplary set of tokens resulting from applying the rule of FIG. 4A to the set of tokens of FIG. 5B via the process of FIG. 2, in accordance with embodiments of the present invention.

FIG. 5D depicts an exemplary regular expression generated by replacing tokens in the set of tokens of FIG. 5C via the process of FIG. 2, in accordance with embodiments of the present invention.

FIG. 6 is a table of entities and relationships used in experiments for determining recall and precision of regular expressions generated by the process of FIG. 2, in accordance with embodiments of the present invention.

FIGS. 7A-7D are tables of results of four sets of experiments organized according to the table of FIG. 6, where the experiments are for determining recall and precision of regular expressions generated by the process of FIG. 2, in accordance with embodiments of the present invention.

DETAILED DESCRIPTION OF THE INVENTION

1 Overview

Figure 1A:
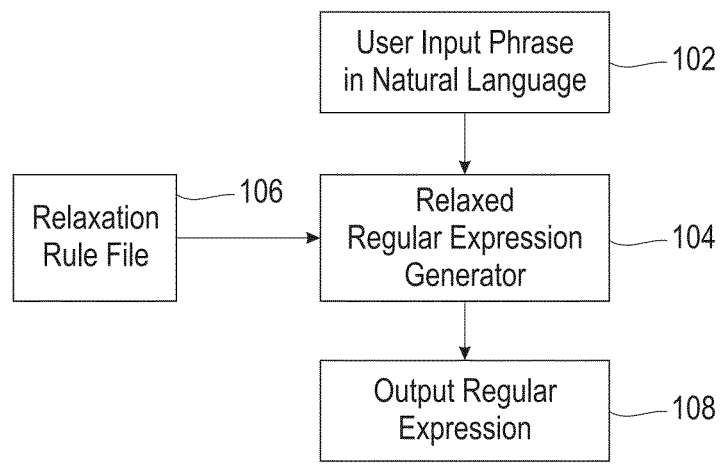
FIG. 1A is a block diagram of a first system for automatically generating regular expressions for relaxed matching of text patterns, in accordance with embodiments of the present invention.

The goal of information extraction (IE) is to extract structured information from unstructured text (a.k.a. plain text) (e.g., documents, files, emails, web pages, etc.). In rule-based IE, rules are written that describe textual patterns of interest, which are to be extracted from unstructured text. Regular expressions are used for expressing such textual patterns of interest. As used herein, a regular expression is defined as a compact representation that describes a set of strings without listing all the elements of the set. A regular expression matches each of the strings in the set.

For example, consider the information extraction task of identifying text patterns that associate a person with his or her phone number. A text pattern of interest for this example is the phrase "can be reached at". Using such a pattern, a rule-based IE system identifies occurrences of the form "<Person> can be reached at <Phone>" and generates the corresponding pairs of related Persons and Phones. In free-form text, however, the phrase "can be reached at" may occur with several variations: extra punctuation, multiple spaces or new lines between words, arbitrary capitalization, colloquial abbreviations for words (e.g., "reached" abbreviated as "rchd"). Such variation in text is particularly true for informal communication mediums such as email where the formatting and style of the text is not strictly controlled. A regular expression is used to account for the original input phrase "can be reached at" as well as the multiple variations.

The task of creating a regular expression that not only matches an original input phrase like "can be reached at" in the example presented above, but also the other variations is beyond the knowledge of the average untrained user of an information extraction system. The present invention addresses this problem by providing a generic and extensible rule-based framework for automatically generating a regular expression from a given input phrase (i.e., a plain text pattern) provided by a user. The input phrase is provided in a natural, human language (e.g., a user's native English). The regular expression output by the present invention improves the recall (i.e., increase the set of occurrences of the input phrase and its variations that are identified in the text) with little or no decrease in precision (i.e., without increasing the identification of spurious instances in the text).

As used herein, relaxation is the method of the present invention that converts a plain text pattern to an output regular expression that matches the original plain text pattern and that matches other strings that are variations of the original plain text pattern. The overall algorithm whose execution provides relaxation is referred to herein as the relaxed regular expression generator. The relaxation disclosed herein includes syntactic relaxation and semantic relaxation. Syntactic relaxation includes matching to text patterns whose variation from the original plain text pattern is based on primarily syntactic aspects of the original plain text pattern such as punctuation and whitespace between words (i.e., matching to patterns that have different punctuation and/or whitespace while having the same words and the same meaning as the original plain text pattern). Semantic relaxation includes matching to text patterns whose variation from the original plain text pattern is based on a modification of the words of the original plain text pattern while retaining the meaning of the original plain text pattern.

2 Regular Expression Generation System

FIG. 1A is a block diagram of a first system for automatically generating regular expressions for relaxed matching of text patterns, in accordance with embodiments of the present invention. First system 100 includes a user input phrase 102, a relaxed regular expression generator 104, a relaxation rule file 106 and an output regular expression 108. User input phrase 102 is input into relaxed regular expression generator 104 as a phrase expressed in a natural, human language (e.g., a native English phrase). Relaxed regular expression generator 104 obtains relaxation rules from relaxation rule file 106 and applies the obtained rules to user input phrase 102 to automatically generate regular expression 108 as output. The relaxation rules in file 106 are predefined manually by, for example, an administrator of system 100. Hereinafter, relaxed regular expression generator 104 is also referred to simply as regular expression generator 104 or generator 104. Relaxation rules included in relaxation rule file 106 are also referred to herein simply as rules. The functionalities of the components of system 100 are described in more detail below relative to FIG. 2.

In one embodiment, system 100 includes an information extraction system (not shown) that includes an annotator generator (not shown). The annotator generator is coupled to relaxed regular expression generator 104. In this embodiment, generator 104 receives as input an annotator rule expressed in a natural, human language and outputs an annotator rule as regular expression 108. The output regular expression is a relaxed regular expression in that it matches the original input annotator rule as well as variations of the annotator rule. The annotator generator then uses output regular expression 108 to generate an annotator that facilitates information extraction.

In another embodiment, system 100 includes a search engine (not shown) that is coupled to relaxed regular expression generator 104. In this embodiment, generator 104 receives as input a search query expressed in a natural, human language and outputs a query as regular expression 108. The output regular expression 108 is a relaxed regular expression in that it matches the input search query as well as variations of the search query. The search engine then uses output regular expression 108 to generate results (e.g., documents) of a search that uses the input search query and its variations.

Figure 1B:
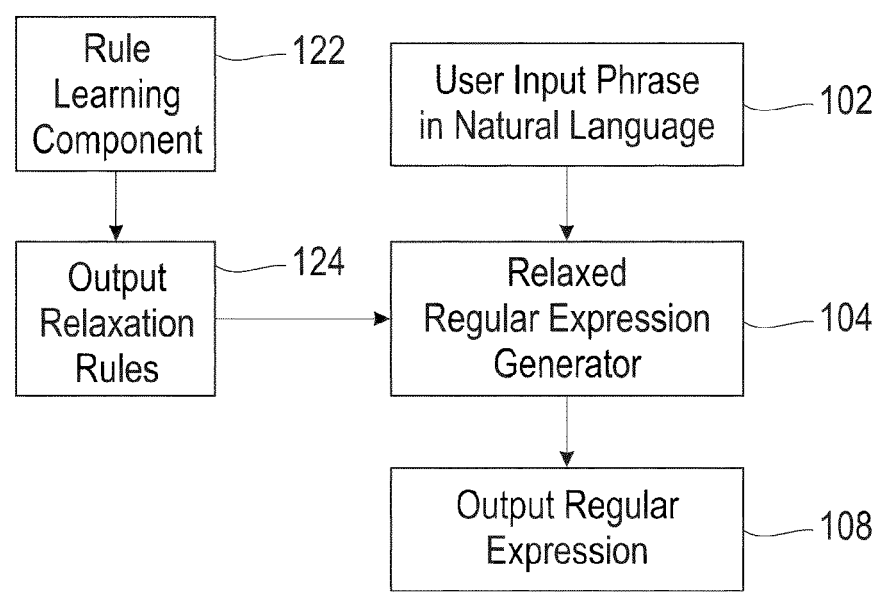
FIG. 1B is a block diagram of a second system for automatically generating regular expressions for relaxed matching of text patterns, in accordance with embodiments of the present invention.

FIG. 1B is a block diagram of a second system for automatically generating regular expressions for relaxed matching of text patterns, in accordance with embodiments of the present invention. Second system 120 implements another embodiment of the present invention and includes user input phrase 102, relaxed regular expression generator 104, a software-based rule learning component 122, one or more output relaxation rules 124 and an output regular expression 108. Again, user input phrase 102 is expressed in a natural, human language and is input into generator 104. In this embodiment, rule learning component 122 automatically learns one or more relaxation rules and outputs one or more rules 124, which are then obtained by generator 104 and applied by generator 104 to user input phrase 102 to generate regular expression 108.

Similar to the embodiment described above relative to system 100 (see FIG. 1A), system 120 may include an information extraction system (not shown) that includes an annotator generator (not shown) coupled to relaxed regular expression generator 104. The functionality of the information extraction system, the annotator generator and generator 104 is the same as described above relative to system 100 (see FIG. 1A). In another embodiment similar to an embodiment described above relative to system 100 (see FIG. 1A), system 120 may include a search engine coupled to generator 104. The functionality of the search engine and generator 104 is the same as described above relative to system 100 (see FIG. 1A).

3 Regular Expression Generation Process

Figure 2:
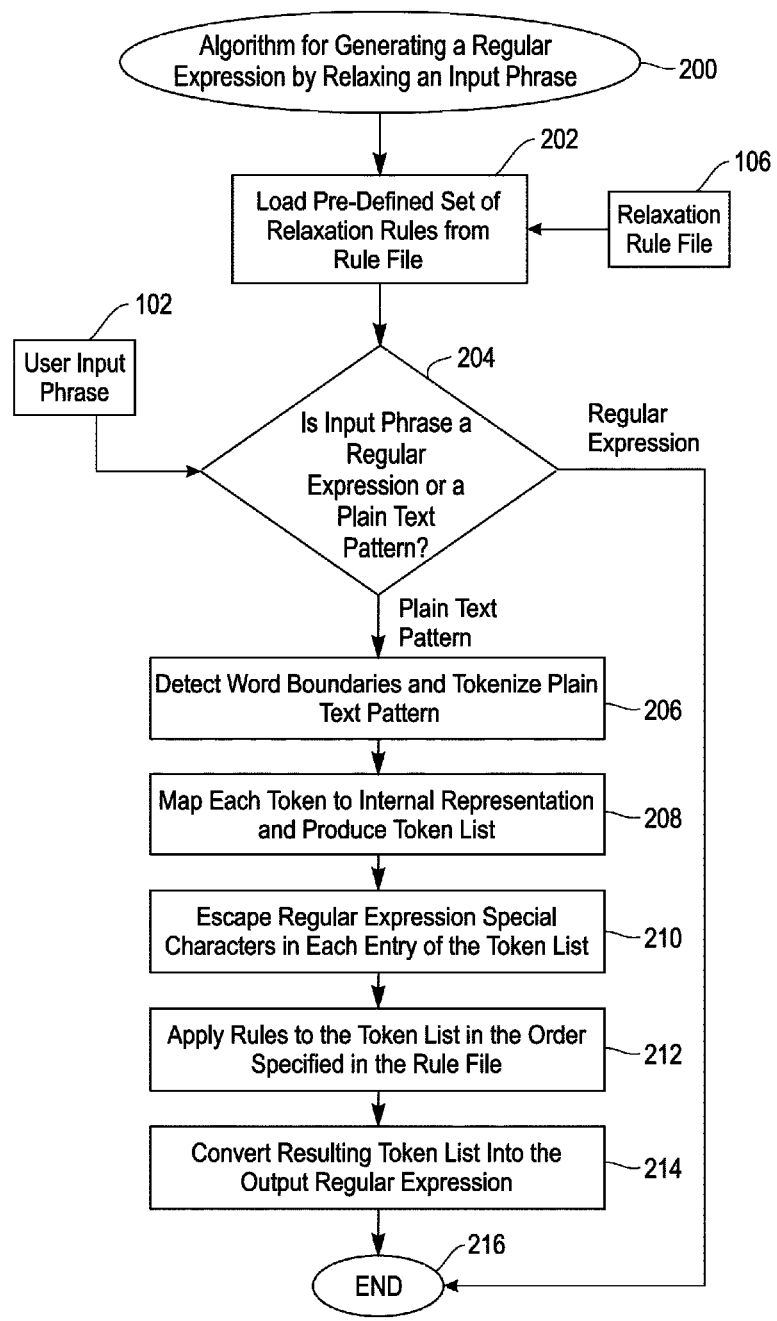
FIG. 2 is a flow diagram of a regular expression generation process implemented by the system of FIG. 1A or FIG. 1B, in accordance with embodiments of the present invention.

FIG. 2 is a flow diagram of a regular expression generation process implemented by the system of FIG. 1A or FIG. 1B, in accordance with embodiments of the present invention. The regular expression generation process starts at step 200. In step 202 regular expression generator 104 (see FIG. 1A and FIG. 1B) loads and parses a predefined rule set from relaxation rule file 106. The predefined rule set loaded in step 202 includes rules that include predefined modification operators (e.g., replacement and splitting operators). Each predefined modification operator may be employed by one or more rules in the rule set. Each rule in the predefined rule set that employs a predefined modification operator specifies one or more attributes or one or more parameters used when applying the modification operator to a token list.

In step 204, regular expression generator 104 (see FIG. 1A and FIG. 1B) receives user input phrase 102 and determines whether user input phrase 102 is already a regular expression or whether phrase 102 is a plain text pattern.

If step 204 determines that phrase 102 is a plain text pattern, then in step 206 generator 104 (see FIG. 1A and FIG. 1B) detects word boundaries in phrase 102 and tokenizes the plain text pattern that comprises phrase 102 to generate a set of input tokens. In step 208, generator 104 (see FIG. 1A and FIG. 1B) maps each of the aforementioned input tokens to a specific, internal representation for the system (e.g., system 100 of FIG. 1A) to produce a token list (i.e., a sequence of tokens).

In step 210, generator 104 (see FIG. 1A and FIG. 1B) replaces regular expression special characters in each entry of the token list produced in step 208 with escaped characters to generate a transformed token list (i.e., a tokenized and escaped phrase). For example, in step 210, Java® regular expression characters in a token list produced in step 208 are replaced with escaped characters.

In step 212, generator 104 (see FIG. 1A and FIG. 1B) applies one or more rules from the predefined rule set loaded in step 202 to the token list generated in step 210 in an order specified in relaxation rule file 106. The application of the one or more rules in step 212 generates a modified token list (a.k.a. a tokenized and modified phrase) that is a transformed version of input phrase 102. For any applied rule that includes a modification operator, step 212 includes applying the modification operator to the token list generated in step 210 or to an intermediate token list generated during the execution of step 210.

In step 214, generator 104 converts the modified token list generated in step 212 into a string, which represents output regular expression 108 (see FIG. 1A and FIG. 1B). Following step 214, the regular expression generation process ends at step 216.

Returning to step 204, if generator 104 (see FIG. 1A and FIG. 1B) determines that input phrase 102 is already a regular expression, then the above-described processing of steps 206, 208, 210, 212 and 214 is not performed, the input is passed to the output unchanged, and the regular expression generation process ends at step 216. For example, given that input phrase 102 is:

meet\s+(\w+\s+){0,5}<RoomNumber> generator 104 (see FIG. 1A and FIG. 1B) recognizes that the input phrase is a regular expression and returns the input phrase unchanged as output 108 (see FIG. 1A and FIG. 1B).

If, however, input phrase 102 is the following phrase:

meet at<RoomNumber> then generator 104 (see FIG. 1A and FIG. 1B) outputs the following relaxed regular expression as the result of performing the transformations of steps 206, 208, 210, 212 and 214:

\bmeet\bW+\bat\b which matches any string in which meet and at are adjacent words with an arbitrary whitespace between meet and at. Section 5 presented below describes experiments that demonstrate that utilizing the process of FIG. 2 to generate such relaxed regular expressions results in significantly higher recall and similar precision when compared to the input plain text pattern.

4 EXAMPLES

This section includes a sample rule set and algorithms for applying rules in the sample rule set.

4.1 Relaxation Rules

Relaxation rules are defined in a special file 106 (see FIG. 1A and FIG. 1B), which is loaded when the regular expression generator 104 (see FIG. 1A and FIG. 1B) is started. The rules are composed using a predefined set of modification operators. While the framework for relaxation disclosed herein is generic and can be customized by any number of modification operators, this section restricts its attention to three basic operators: WHITESPACE, REPLACE_WORD and SPLIT_AT_CHARACTER. FIG. 3 depicts an example of a rule set 300 that is included in relaxation rule file 106 (see FIG. 1A and FIG. 1B). Rule set 300 includes four rules that are expressed in a simple Extensible Markup Language (XML) format and that include the aforementioned basic operators. Note that in rule set 300, each rule has an attribute <stackposition> that controls the order in which the rules must be applied. The operators included in the rules of rule set 300 are briefly described below:

WHITESPACE: This operator replaces whitespace which has been identified as token delimiters with the replacement regular expression defined in the attribute <replacement>.

REPLACE_WORD: This operator replaces a sequence of one or more tokens with a replacement regular expression. In the example shown in FIG. 3, the tokens "did not" are replaced by a regular expression that matches either the phrase did\s+not or the phrase didn't. Similarly, a token consisting of a single colon character (i.e., ":") is replaced with a regular expression that allows for arbitrary whitespace before and after the colon.

SPLIT_AT_CHARACTER: This operator allows a particular token to be split into two tokens based on the presence of a particular character. In the example of FIG. 3, the SPLIT_AT_CHARACTER operator splits a token based on the presence of the colon character.

Hereinafter, a reference to a WHITESPACE rule, a REPLACE_WORD rule or a SPLIT_AT_CHARACTER rule indicates a rule from a rule set, where the rule includes the aforementioned WHITESPACE, REPLACE_WORD or SPLIT_AT_CHARACTER operator, respectively.

4.2 Analyzing and Applying Rules

FIG. 4A depicts an algorithm 400 whose execution applies a REPLACE_WORD rule included in the rule set of FIG. 3, in accordance with embodiments of the present invention. Algorithm 400 takes as input three parameters: (1) a search phrase, which is did not in this example; (2) the replacement regular expression which replaces the search phrase (e.g., ((did\s+not)|(didn\'t)) is the replacement regular expression that replaces did not); and (3) a list of input tokens (i.e., tokenizedInput in algorithm 400), which is a tokenized and escaped set of tokens resulting from step 210 of FIG. 2. For example, the input to algorithm 400 is a set of tokens that has been tokenized by a whitespace tokenizer and in which regular expression special characters have been escaped already.

Algorithm 400 produces an output list of tokens which includes the replacements made by using the aforementioned replacement regular expression to replace any occurrence of the search phrase.

During an initialization phase, all offsets (i.e., ordered from their left to right occurrences) are determined where the search phrase matches the tokenized input (see line 1 of algorithm 400). Furthermore, an empty list of tokens is initialized (see line 2 of algorithm 400) to eventually hold the set of modified tokens. After the initialization, for each offset, all tokens before the offset are copied to the output token set (see line 7 of algorithm 400). Next, the token for the replacement regular expression is added (see line 8 of algorithm 400). Finally, after considering all offsets, the tokens from the last replacement tokens are added until the end of the input list is reached (see line 11 of algorithm 400).

In the example of Section 4, the input phrase I did not call is transformed initially into a tokenized representation that is illustrated in FIG. 4B as a tokenized phrase 420. After tokenized phrase 420 is escaped in step 210 of FIG. 2, the resulting tokenized and escaped phrase is stored in tokenizedInput, the list of input tokens that is input into algorithm 400 (see FIG. 4A). Then algorithm 400 applies the REPLACE_WORD rule of sample rule set 300 (see FIG. 3) to replace all occurrences of the search phrase did not in tokenizedInput by the replacement regular expression ((did\s+not)|(didn\'t)).

FIG. 4C depicts an exemplary set of tokens 440 that result from executing algorithm 400 (see FIG. 4A) to apply the REPLACE_WORD rule of rule set 300 (see FIG. 3) to tokenized phrase 420 (see FIG. 4B). The set of tokens 440 is generated by performing step 212 of FIG. 2. Following the generation of the set of tokens 440, step 214 (see FIG. 2) generates a conversion of the set of tokens 440 by replacing each DELIM token with the WHITESPACE token defined in rule set 300 (see FIG. 3) (i.e., \W+) and by replacing each BOUNDARY token with \b (i.e., the regular expression syntax for denoting word boundaries). The result of the aforementioned replacements in step 214 (see FIG. 2) is an output regular expression 460 depicted in FIG. 4D.

Figure 5A:
FIG. 5A depicts an algorithm to apply a SPLIT_AT_CHARACTER rule included in the rule set of FIG. 3, in accordance with embodiments of the present invention.

FIG. 5A depicts an algorithm 500 whose execution applies a SPLIT_AT_CHARACTER rule included in the rule set of FIG. 3, in accordance with embodiments of the present invention. Algorithm 500 takes as input a list of input tokens (i.e., tokenizedInput in algorithm 500), which is a tokenized and escaped set of tokens resulting from step 210 of FIG. 2. For example, the input to algorithm 500 is a set of tokens that has been tokenized by a whitespace tokenizer and in which regular expression special characters have been escaped already. Algorithm 500 applies the SPLIT_AT_CHARACTER rule, which splits up a token based on the presence of a colon character. For example, consider the following input phrase to algorithm 500:

phonenumber: 123-4567-890 which is represented as the following token list following step 210 of FIG. 2:

<BOUNDARY><TXT> phonenumber:123-4567-890<TXT> <BOUNDARY>

Executing algorithm 500 in step 212 (see FIG. 2) applies the SPLIT_AT_CHARACTER rule of rule set 300 (see FIG. 3) to the token list shown above. The application of the SPLIT_AT_CHARACTER rule splits on the colon included in the token list shown above and generates a token list 520 shown in FIG. 5B.

Following the application of the SPLIT_AT_CHARACTER rule, the second REPLACE_WORD rule of rule set 300 (see FIG. 3) is applied to generate a token list 540 shown in FIG. 5C. That is, the REPLACE_WORD rule in FIG. 3 that includes the colon as the search phrase is applied to generate token list 540. Token list 540 is the result of executing algorithm 400 of FIG. 4A in step 212 (see FIG. 2).

Following the generation of token list 540, step 214 (see FIG. 2) converts token list 540 into a regular expression by replacing the BOUNDARY tokens with \b (i.e., the regular expression syntax for denoting word boundaries). The result of the conversion in step 214 (see FIG. 2) is an output regular expression 560 depicted in FIG. 5D.

5 Experiments

This section describes experiments for determining recall and precision of regular expressions generated by the process of FIG. 2. Experiments in this section are based on the Enron email dataset, which was collected and prepared by the CALO Project led by SRI International of Menlo Park, Calif.

5.1 Experimental Setup

FIG. 6 is a table 600 of entities and relationships selected for the experiments in this section. The entities and relationships of table 600 are selected from the Enron email dataset. A constant window of 30 characters was used for each selected relationship, as indicated by the values in the #chars column of table 600.

5.2 Evaluation Measures

The following metrics are used in this section to measure the efficiency and effectiveness of the selected relationships in table 600:

Precision: determines the number of matched annotations against the number of correct annotations.

Recall: determines the number of relevant annotations against the number of all possible relevant annotations.

Each generated annotation is manually evaluated using the following constraints:

Sentence boundaries: Both entities and the relationship must be within the same sentence.

Thus, examples like the following are not counted:

. . . Peter Meyer. He can be reached at 56666.

Correct entity type: The entities must match the correct type. For example, I can be reached at is not counted as a correct match if the requested entity is a Person and not the Author of the email. As another example, Paul can be reached at his fax number 5223 is not counted as a correct match since the requested entity is not a phone number.

5.3 Experimental Results

Four sets of experiments were conducted regarding the recall and precision of the generated regular expressions in contrast to handcrafted regular expressions.

5.3.1 Person . . . Phone Number

In the first set of experiments, the relationship between a person and phone number is investigated and is hereinafter referred to as the person . . . phone number relationship. FIG. 7A is a table 700 of results of the investigation of the person . . . phone number relationship. Typically, an annotator for a person . . . phone number relationship relates the phone number and a verb. Currently, this person . . . phone number relationship is modeled using multiple different handcrafted expressions based on the following native English phrases: can be reached at, can be contacted at, a call at, #, number is, and at. All of the aforementioned native English phrases express the relationship give me the phone number of a person, and therefore are handled as a single semantic relationship. The high precision and recall of this set of experiments shown in table 700 is mainly due to the influence of the "strong" pattern of the phrase "at".

Improvement potential for the regular expression generator: In the experiment regarding the person . . . phone number relationship, the main reason for false positives are sentence boundaries. A careful sentence boundary detection combined with a co-reference resolution could help to improve the precision. All handcrafted regular expressions use the line limiter ˆ and $. This operator lowers the recall significantly, while increasing the precision only slightly. In one embodiment, the regular expression generator interface is improved by allowing the user to turn off or turn on this sentence boundary detection feature. Another reason for the loss in precision is the poor performance of an entity recognizer, which influences the precision of the generated regular expressions indirectly. As used herein, an entity recognizer is a known component that recognizes entities (e.g., persons, phone numbers, organizations, etc.) for an information extraction task. An entity recognizer may be a component (not shown) of a system that includes relaxed regular expression generator 104 (see FIG. 1A and FIG. 1B).

5.3.2 Person . . . Person

In the second set of experiments, the relationship expressing that one person works for another person is investigated and is hereinafter referred to as the person . . . person relationship. To express the person . . . person relationship, versions of the phrase works for and the noun assistant were used in the second set of experiments. FIG. 7B is a table 720 of results of the investigation of the person . . . person relationship.

Improvement potential for the regular expression generator: The reason for the high precision of the handcrafted regular expression is the usage of the right regular expression line limiter $ and the definition of selected optional words before (e.g., research and executive) and after (e.g., to and is) the noun assistant. However, detecting semantically relevant words before and after the native English input is far beyond the scope of a pure syntactic regular expression generator. Again, improving the performance of the entity recognizer will enhance the precision of the generated regular expressions significantly.

5.3.3 Person . . . Organization

In the third set of experiments, the relationship expressing the semantics that a person works for a particular organization is investigated and is hereinafter referred to as the person . . . organization relationship. To express the person . . . organization relationship, the following variants of the verb work and the prepositions with and for were used: works for, working for, work with, and working with. FIG. 7C is a table 740 of results of the investigation of the person . . . organization relationship.

Improvement potential for the regular expression generator: The reason for the low recall of the handcrafted regular expression is the line boundary tokens ˆ and $, in particular for the phrase working with. In one embodiment, the regular expression generator is improved by including an option to switch this line boundary functionality off or on. In another embodiment, the regular expression generator is improved by including an option that allows a user to define how many words are ignored before and after the native English input.

5.3.4 Organization . . . Organization

In the fourth set of experiments, the relationship expressing the semantics that an organization has been merged with or has been acquired by another organization is investigated and is hereinafter referred to as the organization . . . organization relationship. To express the organization . . . organization relationship, the following variants were used: agreed to buy, merged with, acquisition of, acquired, and acquires. FIG. 7D is a table 760 of results of the investigation of the organization . . . organization relationship.

Improvement potential for the regular expression generator: Again, this experiment shows that the main value of a handcrafted regular expression is the careful disjunctive combination of relevant verbs for a particular relationship (e.g., the combination of the verbs merge and acquire). An ideal generated regular expression is a disjunctive expression consisting of relevant variants for merge and acquire (e.g., merge OR merged OR acquire OR acquired).

6 Conclusions

The experiments described above in Section 5 show that generated regular expressions based on native English user input can replace handcrafted regular expressions for derived annotators in Avatar. Generated regular expressions are a powerful concept and, in terms of recall and precision, perform similarly to handcrafted regular expressions. However, for some of the experiments described above, false positives were observed which lower precision and recall. To overcome these shortcomings, the following conclusions for the Avatar implementation are derived:

1. The usage of line boundaries, such as ˆ and $, enhances the precision slightly, but lowers the recall drastically. Therefore, the regular expression generator does not consider line boundaries.

2. Regular expressions matching entities across sentences are a minor source for false positives in one of the experiments. To overcome this problem, only text matches within the boundaries of one sentence are considered. However, a few matches may be missed using this approach. To overcome this problem, further investigations are needed to allow the capture of matching entities across sentences.

3. Another major source for false positives is incorrectly identified entities, as recognized from the entity recognizer, which is not part of the regular expression generator. The base annotator for entity recognition has been improved so these false positives will no longer appear.

7 Computing System

Figure 8:
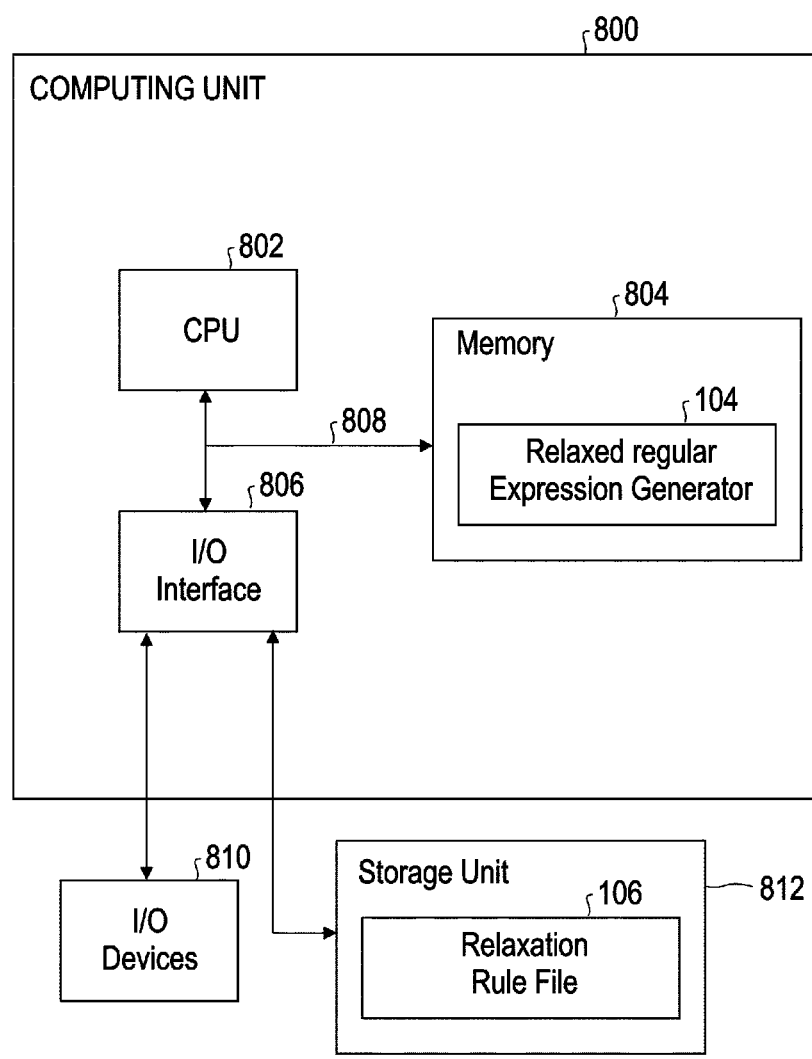
FIG. 8 is a block diagram of a computing unit that includes a relaxed regular expression generator of the system of FIG. 1A or FIG. 1B, in accordance with embodiments of the present invention.

FIG. 8 is a block diagram of a computing unit 800 that includes a relaxed regular expression generator 104 of the system of FIG. 1A or FIG. 1B and that implements the process of FIG. 2, in accordance with embodiments of the present invention. Computing unit 800 generally comprises a central processing unit (CPU) 802, a memory 804, an input/output (I/O) interface 806 and a bus 808, and is coupled to I/O devices 810 and a storage unit 812. CPU 802 performs computation and control functions of computing unit 800. CPU 802 may comprise a single processing unit, or be distributed across one or more processing units in one or more locations (e.g., on a client and server).

Memory 804 may comprise any known type of data storage and/or transmission media, including bulk storage, magnetic media, optical media, random access memory (RAM), read-only memory (ROM), a data cache, a data object, etc. Cache memory elements of memory 804 provide temporary storage of at least some program code in order to reduce the number of times code must be retrieved from bulk storage during execution. Storage unit 812 is, for example, a magnetic disk drive or an optical disk drive that stores data including relaxation rule file 106. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes program code for relaxed regular expression generator 104. Further, memory 804 may include other systems not shown in FIG. 8, such as an operating system (e.g., Linux) that runs on CPU 802 and provides control of various components within and/or connected to computing unit 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 104 for use by or in connection with a computing system 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of automatically generating regular expressions for relaxed matching of text patterns. Thus, the present invention discloses a process for supporting computer infrastructure, comprising integrating, hosting, maintaining and deploying computer-readable code into a computing system (e.g., computing unit 800), wherein the code in combination with the computing unit is capable of performing a method of automatically generating regular expressions for relaxed matching of text patterns.

In another embodiment, the invention provides a business method that performs the process steps of the invention on a subscription, advertising and/or fee basis. That is, a service provider, such as a Solution Integrator, can offer to create, maintain, support, etc. a method of automatically generating regular expressions for relaxed matching of text patterns. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically generating regular expressions for relaxed matching of text patterns, comprising:
  a computing system receiving a first rule specifying a first operator that replaces a search phrase with a replacement regular expression;
  said computing system receiving one or more other rules;
  said computing system receiving an input phrase expressed in a natural language, the input phrase including the search phrase;
  said computing system determining that said received input phrase is a plain text pattern rather than a regular expression;
  prior to using an output regular expression to search documents for the search phrase and one or more variations of the search phrase, said computing system automatically generating the output regular expression by performing the steps of:
    based on said input phrase determined to be the plain text pattern rather than the regular expression, said computing system automatically tokenizing said plain text pattern;
    said computing system automatically generating a first list of tokens based on the tokenized plain text pattern, the first list of tokens including the search phrase;
    based on the first operator specified by the first rule, subsequent to said automatically generating the first list of tokens, subsequent to said receiving the first rule, and subsequent to said receiving said one or more other rules, said computing system determining an offset in the first list of tokens, the offset indicating where the search phrase occurs in the first list of tokens;
    based on the first operator specified by the first rule, said computing system copying one or more tokens that are before the offset in the first list of tokens to a second list of tokens;
    based on the first operator specified by the first rule, and subsequent to said copying the one or more tokens that are before the offset to the second list of tokens, said computing system appending a token of the replacement regular expression to the second list of tokens;

based on the first operator specified by the first rule, and subsequent to said appending the token of the replacement regular expression to the second list of tokens, said computing system appending one or more tokens that are after the search phrase in the first list of tokens to the second list of tokens; and based on the received first rule and the received one or more other rules, based on the token of the replacement regular expression appended to the second list of tokens, and subsequent to said appending the one or more tokens that are after the search phrase to the second list of tokens, said computing system converting the second list of tokens into an output regular expression so that the output regular expression includes the replacement regular expression, the output regular expression being a representation describing a set of strings including said plain text pattern and one or more variations of said plain text pattern without said output regular expression listing said plain text pattern and each variation of said one or more variations of said plain text pattern, said one or more variations of said plain text pattern having a same meaning as said plain text pattern and including the one or more variations of the search phrase; and subsequent to said converting the second list of tokens to the output regular expression and subsequent to said automatically generating the output regular expression, said computing system using the output regular expression to search the documents for the search phrase and the one or more variations of the search phrase.

2. The method of claim 1, wherein said receiving the first rule includes receiving the first rule expressed in an Extensible Markup Language (XML) format, and wherein said receiving the one or more other rules includes receiving the one or more other rules expressed in the XML format.

3. The method of claim 1, further comprising:

said computing system receiving a set of rules consisting of the first rule, a second rule, a third rule, and a fourth rule, wherein said receiving the set of rules consists of said receiving the first rule and said receiving the one or more other rules, wherein the second rule specifies a second operator that detects a colon specified by said second rule and splits a token of said first list of tokens into two tokens based on said colon detected in the token of the first list of tokens, wherein the third rule specifies a third operator that replaces the colon with a second replacement regular expression, and wherein the fourth rule specifies a fourth operator that replaces whitespace with a third replacement regular expression;

prior to said automatically generating the first list of tokens, said computing system identifying whitespace in the plain text pattern, wherein said automatically generating the first list of tokens includes replacing the identified whitespace with a delimiter token in the first list of tokens:

prior to said converting the second list of tokens, and based on the fourth operator specified by the fourth rule, said computing system copying said delimiter token to the second list of tokens, wherein said converting the second list of tokens into the output regular expression includes replacing the delimiter token with a whitespace token specified in the fourth rule;

prior to said converting the second list of tokens and based on the second operator specified by the second rule, said computing system detecting the colon in a second token in the first list of tokens, and in response to said detecting the colon, said computing system splitting the second token into third and fourth tokens with the colon in between the third and fourth tokens; and based on the third operator specified by the third rule, subsequent to said splitting the second token into the third and fourth tokens with the colon in between the third and fourth tokens, and prior to said converting the second list of tokens, said computing system appending a token of the second replacement regular expression to the second list of tokens, wherein said converting the second list of tokens includes, based on the token of the second replacement regular expression appended to the second list of tokens, said computing system converting the second list of tokens into the output regular expression so that the output regular expression further includes the second replacement regular expression.

4. A computer program product for automatically generating regular expressions for relaxed matching of text patterns, the computer program product comprising:

a non-transitory, computer readable storage device; and a computer readable program code stored on the non-transitory, computer readable storage device, said computer readable program code comprising:

computer readable program code configured for receiving a first rule specifying a first operator that replaces a search phrase with a replacement regular expression;

computer readable program code configured for receiving one or more other rules:

computer readable program code configured for receiving an input phrase expressed in a natural language, the input phrase including the search phrase;

computer readable program code configured for determining that said input phrase is a plain text pattern rather than a regular expression;

computer readable program code configured for, prior to using an output regular expression to search documents for the search phrase and one or more variations of the search phrase, automatically generating an output regular expression, the program code configured for automatically generating the output regular expression including:

computer readable program code configured for, based on the input phrase determined to be the plain text pattern rather than the regular expression, automatically tokenizing said plain text pattern;

computer readable program code configured for automatically generating a first list of tokens based on the tokenized plain text pattern, the first list of tokens including the search phrase;

computer readable program code configured for, based on the first operator specified by the first rule, subsequent to said automatically generating the first list of tokens, subsequent to said receiving the first rule, and subsequent to said receiving said one or more other rules, determining an offset in the first list of tokens, the offset indicating where the search phrase occurs in the first list of tokens;

computer readable program code configured for, based on the first operator specified by the first rule, copying one or more tokens that are before the offset in the first list of tokens to a second list of tokens;

computer readable program code configured for, based on the first operator specified by the first rule, and subsequent to said copying the one or more tokens that are before the offset to the second list of tokens, appending a token of the replacement regular expression to the second list of tokens;

computer readable program code configured for, based on the first operator specified by the first rule, and subsequent to said appending the token of the replacement regular expression to the second list of tokens, appending one or more tokens that are after the search phrase in the first list of tokens to the second list of tokens; and computer readable program code configured for, based on the received first rule and the received one or more other rules, based on the token of the replacement regular expression appended to the second list of tokens, and subsequent to said appending the one or more tokens that are after the search phrase to the second list of tokens, converting the second list of tokens into an output regular expression so that the output regular expression includes the replacement regular expression, the output regular expression being is a representation describing a set of strings including said plain text pattern and one or more variations of said plain text pattern without said output regular expression listing said plain text pattern and each variation of said one or more variations of said plain text pattern, said one or more variations of said plain text pattern having a same meaning as said plain text pattern and including the one or more variations of the search phrase; and computer readable program code configured for, subsequent to said converting the second list of tokens to the output regular expression and subsequent to said automatically generating the output regular expression, using the output regular expression to search the documents for the search phrase and the one or more variations of the search phrase.

5. The program product of claim 4, wherein said computer readable program code configured for receiving the first rule includes computer readable program code configured for receiving the first rule expressed in an Extensible Markup Language (XML) format, and wherein said computer readable program code configured for receiving the one or more other rules includes computer readable program code configured for receiving the one or more other rules expressed in the XML format.

6. The program product of claim 4, further comprising:
computer readable program code configured for receiving a set of rules consisting of the first rule, a second rule, a third rule, and a fourth rule, wherein said computer readable program code configured for receiving the set of rules consists of said computer readable program code for receiving the first rule and said computer readable program code for receiving the one or more other rules, wherein the second rule specifies a second operator that detects a colon specified by said second rule and splits a token of said first list of tokens into two tokens based on said colon detected in the token of the first list of tokens, wherein the third rule specifies a third operator that replaces the colon with a second replacement regular expression, and wherein the fourth rule specifies a fourth operator that replaces whitespace with a third replacement regular expression;

computer readable program code configured for, prior to said automatically generating the first list of tokens, identifying whitespace in the plain text pattern, wherein said computer readable program code configured for automatically generating the first list of tokens includes computer readable program code configured for replacing the identified whitespace with a delimiter token in the first list of tokens;

computer readable program code configured for, prior to said converting the second list of tokens, and based on the fourth operator specified by the fourth rule, copying said delimiter token to the second list of tokens, wherein said computer readable program code configured for converting the second list of tokens into the output regular expression includes computer readable program code configured for replacing the delimiter token with a whitespace token specified in the fourth rule;

computer readable program code configured for, prior to said converting the second list of tokens and based on the second operator specified by the second rule, detecting the colon in a second token in the first list of tokens, and in response to detecting the colon, splitting the second token into third and fourth tokens with the colon in between the third and fourth tokens; and computer readable program code configured for, based on the third operator specified by the third rule, subsequent to said splitting the second token into the third and fourth tokens with the colon in between the third and fourth tokens, and prior to said converting the second list of tokens, appending a token of the second replacement regular expression to the second list of tokens, wherein said computer readable program code configured for converting the second list of tokens includes computer readable program code configured for, based on the token of the second replacement regular expression appended to the second list of tokens, converting the second list of tokens into the output regular expression so that the output regular expression further includes the second replacement regular expression.

* * * * *